E. B. CAMPBELL.
PACKING RING.
APPLICATION FILED MAR. 28, 1912.
1,034,582.
Patented Aug. 6, 1912.
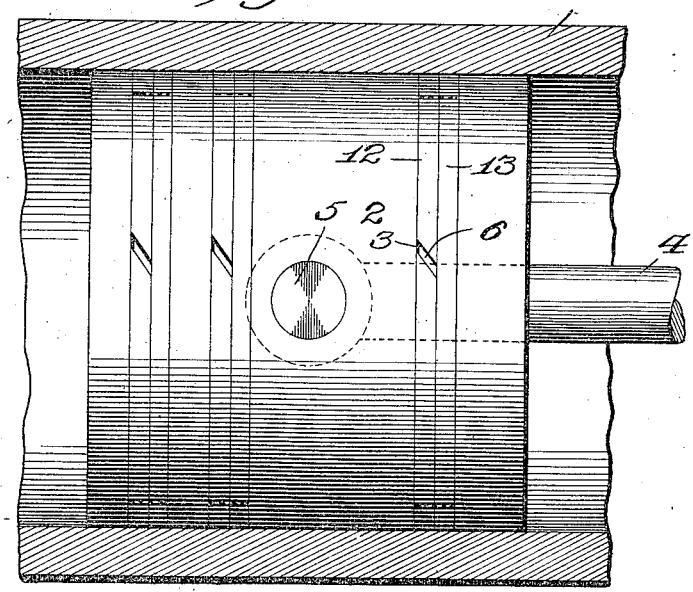
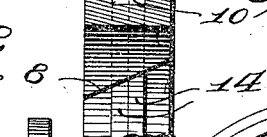
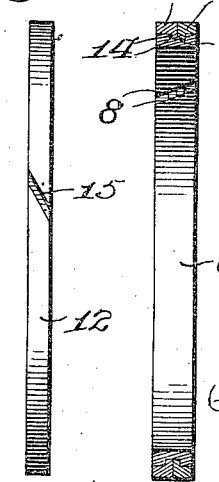
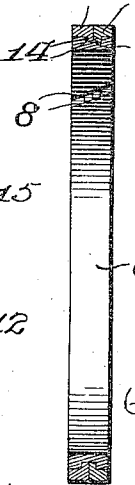
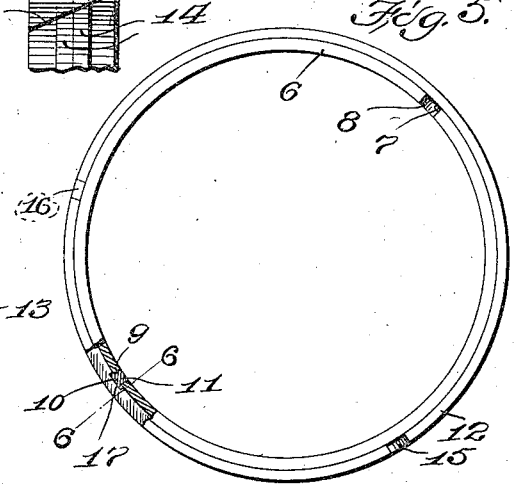
Attest:
E. L. Wallace.
E. M. Harrington.
Inventor
Edward B. Campbell
by Higdon & Longan Attys.

UNITED STATES PATENT OFFICE.

EDWARD B. CAMPBELL, OF ST. LOUIS, MISSOURI, ASSIGNOR OF ONE-HALF TO AMBRO J. NORTHCRAFT, OF ST. LOUIS, MISSOURI.

PACKING-RING.

1,034,582.  Specification of Letters Patent.  Patented Aug. 6, 1912.

Application filed March 28, 1912. Serial No. 686,901.

*To all whom it may concern:*

Be it known that I, EDWARD B. CAMPBELL, a citizen of the United States, and resident of St. Louis, Missouri, have invented certain new and useful Improvements in Packing-Rings, of which the following is a specification containing a full, clear, and exact description, reference being had to the accompanying drawings, forming a part hereof.

My invention relates to improvements in packing rings for pistons, and the object of my invention is to construct a packing which consists of three metallic, elastic, open rings, the openings being separated from each other so as to break joints, and arrange two of the rings upon a larger base ring so that when the rings are placed in position upon the piston they will expand to bear uniformly against the entire inner periphery of the cylinder.

With the above purposes in view my invention consists in certain novel features of construction and arrangement of parts as will be hereinafter more fully described, pointed out in the claims and illustrated by the accompanying drawings, in which—

Figure 1 shows a piston carrying a number of my improved packing rings; Fig. 2 is a sectional view of the assembled rings; Fig. 3 is an edge view of one of the outer rings showing the opening therein; Fig. 4 is an edge view of the other outer ring; Fig. 5 is an elevation of the assembled rings showing a portion of one of the outer rings broken away and a portion of the inner or base ring in section; and Fig. 6 is an enlarged, sectional, detail view taken on the line 6—6 of Fig. 5.

Referring by numerals to the accompanying drawings: 1 designates an ordinary cylinder, 2 an ordinary piston provided with the annular channels 3.

4 designates the piston rod which is connected with the piston by means of the pin 5. All of the parts just described are of ordinary construction, and form no part of my invention.

6 designates the base ring of my improved packing, which may be formed by cutting a section from a cylinder, the width of the section being equal to the width of the channel 3 which the ring is designed to fill. Before the section has been separated as described, the annular groove 7 is formed in the outer periphery of the ring. After the groove has been formed a diagonal section is removed to form the angular ends 8—8, thereby forming an "open ring". The open ring is then placed upon a drill and an opening 9 is formed through the ring within the groove 7 about diametrically opposite the angular ends 8. The opening 9 is designed to receive a key 10, the head of which is preferably rectangular and lies across the groove 7. The stem 11 of the key is inserted through the opening 9 and its inner end upset.

12 and 13 designate mating outer rings which overlie the base ring. The combined widths of the rings 12 and 13 are equal to the width of the base ring 6. The rings 12 and 13 are formed, as is the ring 6, by cutting sections of the desired length from a cylinder. Before these sections have been cut a portion of their inner faces is removed to produce the annular flanges 14. These flanges 14 are located at the abutting faces of the rings 12 and 13 and the combined widths of the flanges are equal to the width of the groove 7. In each of the rings 12 and 13 there is a diagonal section removed to form the angular ends 15 in the ring 12 and angular ends 16 in the ring 13.

The inside diameter of the ring 6 is slightly in excess of the diameter of the piston taken at a point through one of the channels 3 so that when the ring 6 is placed in the groove, compressed slightly by drawing its ends together, and held by the outer rings 12 and 13, the said ring 6 will have a tendency at all times to force the rings 12 and 13 against the inner periphery of the engine cylinder.

Each of the rings 12 and 13 has a diameter slightly in excess of the diameter of the piston proper, and when placed in position in one of the channels 3 over the base ring 6 and compressed by bringing its ends together, each of the rings will have a tendency to bear outwardly against the inner periphery of the engine cylinder.

When the rings are assembled the diagonal cuts in the rings are as widely separated as possible in order to break joints.

In Figs. 5 and 6, I show the flanges 14 cut away at 17, the widths of the cuts being equal to the width of the head of the key 10 in the base ring. These cut away portions embracing the key serve to prevent a relative rotary movement of all of the rings, so that at all times the openings in the rings will be held in positions to break joints.

When all of the rings are placed in the piston, and the piston placed in position in the cylinder, and in the event the piston does not fit perfectly within the cylinder, the rings 12 and 13 will expand at their open ends to approximately fit the engine cylinder. The balance of the rings, that is the portions of the rings removed from their openings, will be expanded by the base ring 6 to fit the engine cylinder. It will thus be seen that I obtain what may be termed a "three point" expansion packing ring.

I am aware that heretofore packing rings have been made of a number of parts, two being a common number, opening at diametrically opposite points. These rings were open as are my rings and compressed to fit in the grooves in the piston, but in view of the fact that the compression of a circular ring distorted each ring, the combined rings formed a distorted circle which could not possibly accurately fit the entire inner periphery of the engine cylinder. These rings, in a number of cases, overlapped each other, but due to their distortion this overlapping would not prevent leakage through the piston.

The flanges 14 of the outer rings and the groove in the inner rings form a joint which prevents leakage, due to the fact that the outer rings and the inner ring are broken at points of equal separation.

I claim:

1. A packing for pistons having angular grooves, comprising a resilient, open base ring having a groove in its outer periphery, a pair of outer rings each of which is an open ring and constructed of resilient material, and arranged to embrace the base ring, a flange on each of the outer rings arranged to fit the groove in the base ring, in order to form a steam-tight joint between all of the rings, and whereby all of the rings may be moved diametrically relative to each other.

2. A packing for pistons having angular grooves, comprising a resilient, open base ring having a groove in its outer periphery, a pair of outer rings each of which is an open ring and constructed of resilient material, the combined widths of the outer rings being equal to the width of the base ring and arranged to embrace the base ring, a flange on each of the outer rings arranged to fit the groove in the base ring, coinciding portions of said flanges being removed to form key-ways, and a key carried by the base ring for engagement in said keyways to prevent relative rotary movement of all of the rings.

In testimony whereof, I have signed my name to this specification, in presence of two subscribing witnesses.

EDWARD B. CAMPBELL.

Witnesses:
E. L. WALLACE,
N. G. BUTLER.